US008112546B2

(12) United States Patent
Razmov et al.

(10) Patent No.: US 8,112,546 B2
(45) Date of Patent: Feb. 7, 2012

(54) ROUTING USERS TO RECEIVE ONLINE SERVICES BASED ON ONLINE BEHAVIOR

(75) Inventors: Valentin Nikolaev Razmov, Seattle, WA (US); Sam Franklin Williams, III, Seattle, WA (US); Hani Saliba, Seattle, WA (US); Aaron Everett Erlandson, Redmond, WA (US); Chad Arthur Nedzlek, Bellevue, WA (US); Kiran Akella Venkata, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 70 days.

(21) Appl. No.: 12/370,635

(22) Filed: Feb. 13, 2009

(65) Prior Publication Data
US 2010/0211694 A1    Aug. 19, 2010

(51) Int. Cl.
*G06F 15/173*    (2006.01)
(52) U.S. Cl. ........ 709/242; 709/223; 709/224; 709/225; 709/226; 726/25
(58) Field of Classification Search ......... 9/226; 726/25
See application file for complete search history.

(56) References Cited

U.S. PATENT DOCUMENTS

| | | | |
|---|---|---|---|
| 5,375,244 A | | 12/1994 | McNair |
| 6,064,972 A * | | 5/2000 | Jankowitz et al. ............ 705/7.28 |
| 6,701,311 B2 | | 3/2004 | Biebesheimer et al. |
| 7,278,163 B2 * | | 10/2007 | Banzhof et al. .................. 726/25 |
| 7,320,131 B1 * | | 1/2008 | O'Toole, Jr. .................... 718/104 |
| 7,337,155 B2 * | | 2/2008 | Yoshida ........................... 706/15 |
| 7,437,728 B2 | | 10/2008 | Stackhouse et al. |
| 7,490,356 B2 * | | 2/2009 | Lieblich et al. .................. 726/25 |
| 2002/0069241 A1 * | | 6/2002 | Narlikar et al. ................ 709/203 |
| 2004/0044760 A1 * | | 3/2004 | Deily et al. ..................... 709/223 |
| 2004/0088408 A1 * | | 5/2004 | Tsyganskiy ..................... 709/225 |
| 2005/0188221 A1 * | | 8/2005 | Motsinger et al. ............. 713/201 |
| 2006/0155764 A1 | | 7/2006 | Tao |
| 2007/0106636 A1 | | 5/2007 | Sridharan et al. |
| 2008/0271143 A1 * | | 10/2008 | Stephens et al. ................. 726/22 |

OTHER PUBLICATIONS

Anderson, et al."Insider Attack and Real-Time Data Mining of User Behavior ", Retrieved at<<http://www.research.ibm.com/journal/rd/513/anderson.pdf>>, IBM J. Res. & Dev. vol. 51 No. 3/4 May/Jul. 2007, pp. 465-475.
Young, et al."Resource Allocation in Federated Distributed Computing Infrastructures ", Retrieved at<<http://www.theether.org/papers/oasis04.pdf>>, pp. 1-10.
Strunk D. John,"Architecture and Interface of a Self-Securing Object Store ", Retrieved at<<http://www.ece.cmu.edu/research/publications/2000/CMU-ECE-2000-021.pdf>>, 2000, pp. 25.
Elf, et al."Applying User Behavior to Bandwidth Adaptations in Collaborative Workspace Applications and Video Conferencing ", Retrieved at<<http://citeseerx.ist.psu.edu/viewdoc/summary?doi=10.1.1.15.3274>>, ACM Multimedia '03 Berkeley, CA USA, pp. 10.

* cited by examiner

*Primary Examiner* — Duyen Doan
(74) *Attorney, Agent, or Firm* — Hope Baldauff Hartman, LLC (57) ABSTRACT

Tools and techniques for routing users to receive online services based on online behavior are provided. These tools may receive representations of activity involving different users in interacting with online services, and may analyze these representations of user activity. The tools may also compute scores for the users based on this previous user activity. The scores may indicate a server system, out of several server systems, which the user is to be routed to obtain online services. The tools may also store the user's score as associated with the user.

16 Claims, 6 Drawing Sheets

ROUTING USERS TO RECEIVE ONLINE SERVICES BASED ON ONLINE BEHAVIOR

BACKGROUND

Traditionally, users operated software on local devices to achieve particular functions. With the increasing prevalence of high-speed communications networks, more users are accessing services hosted remotely on servers, rather than running software locally.

SUMMARY

Tools and techniques for routing users to receive online services based on online behavior are provided. These tools may receive representations of activity involving different users in interacting with online services, and may analyze these representations of user activity. The tools may also compute scores for the users based on this previous user activity. The scores may indicate a server system, out of several server systems, which the user is to be routed to obtain online services. The tools may also store the user's score as associated with the user.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description provides tools and techniques for routing users to receive online services based on online behavior. While the subject matter described herein presents a general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The following detailed description refers to the accompanying drawings that form a part hereof, and that show, by way of illustration, specific example implementations. Referring now to the drawings, in which like numerals represent like elements through the several figures, this description provides various tools and techniques for routing users to receive online services based on online behavior.

Figure 1:
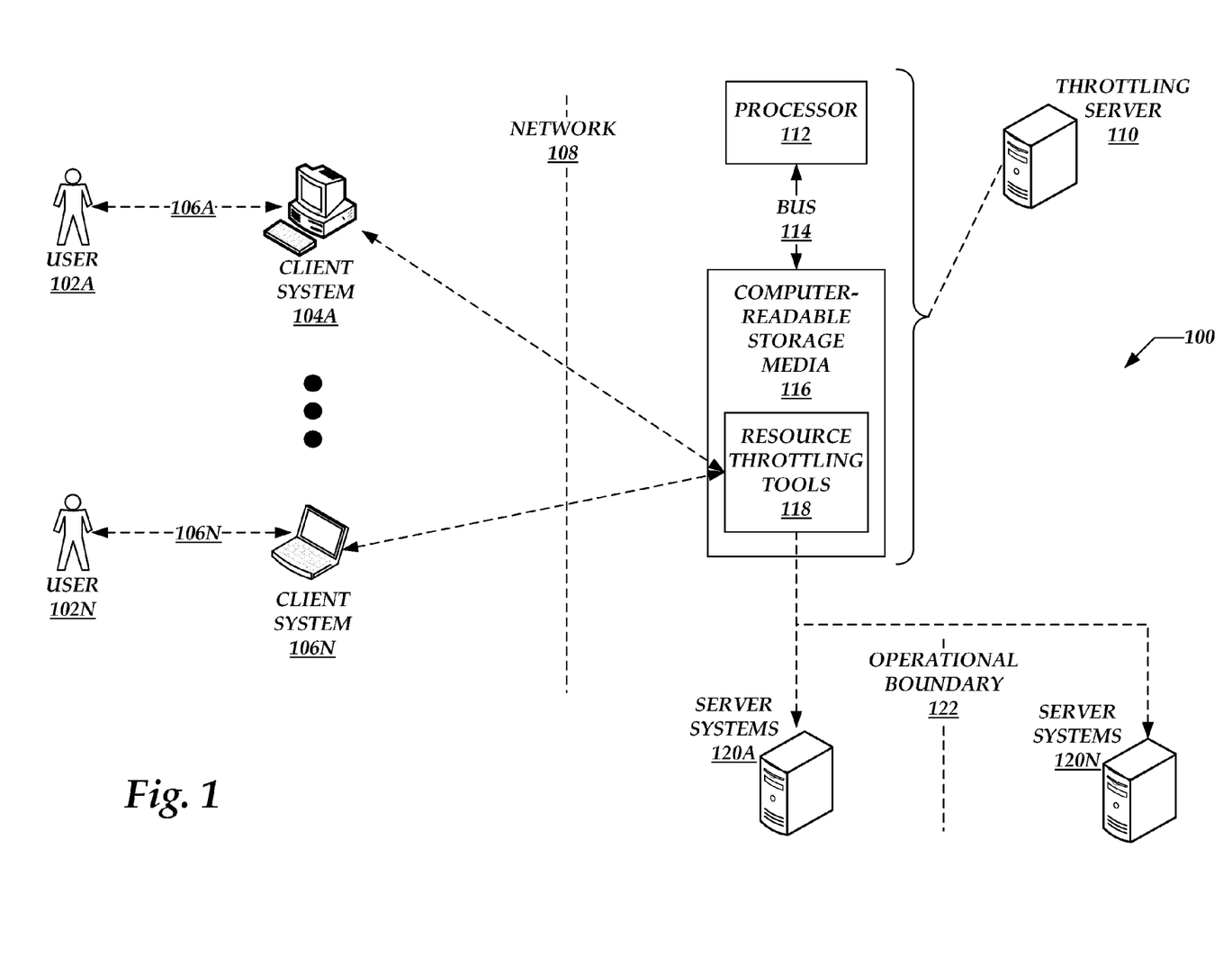
FIG. 1 is a combined block and flow diagram illustrating systems or operating environments suitable for routing users to receive online services based on online behavior in a client/server scenario.

FIG. 1 illustrates systems or operating environments, denoted generally at 100, suitable for routing users to receive online services based on online behavior. Turning to FIG. 1 in more detail, any number of users 102a and 102n (collectively, users 102) may interact with corresponding client systems 104a and 104n (collectively, client systems 104), as represented respectively at 106a and 106n (collectively, interactions 106). The client systems 104 may represent relatively stationary desktop computing systems (e.g., 104a), more mobile laptop or notebook-type computing systems (e.g., 104n), as well as other examples not shown in FIG. 1 in the interest of clarity. For example, these other examples may include smartphones, cellular telephones, wireless communications devices, and the like.

The graphical representations of the client systems 104 as presented in FIG. 1 are chosen only for convenience of illustration, but not to limit possible implementations. For example, suitable hardware environments may also include, but are not limited to: relatively stationary desktop computing systems; laptop notebook, or other relatively mobile computing systems; wireless communications devices, such as cellular phones, smartphones, wireless-enabled personal digital assistants (PDAs), or other similar communications devices. In addition, the tools and techniques described herein for indexing and querying data stores using concatenated terms may be implemented with hardware environments other than those shown in FIG. 1, without departing from the scope and spirit of the present description.

The client systems 104 may be adapted to communicate over one or more communications networks 108. Turning to the networks 108 in more detail, these networks 108 may represent any number of communications networks. For example, the networks 108 may represent local area networks (LANs), wide area networks (WANs), and/or personal area networks (e.g., Bluetooth-type networks), any of which may operate alone or in combination to facilitate operation of the tools and techniques provided in this description. The networks 108 as shown in FIG. 1 also represents any hardware (e.g., adapters, interfaces, cables, and the like), software, or firmware associated with implementing these networks, and may also represent any protocols by which these networks may operate.

The systems 100 shown in FIG. 1 may also include one or more throttling servers 110, which may communicate over the network 108 with the client systems 104. Turning to the throttling servers 110 in more detail, these servers may include one or more processors 112, which may have a particular type or architecture, chosen as appropriate for particular implementations. The processors 112 may couple to one or more bus systems 114, having type and/or architecture that is chosen for compatibility with the processors 112.

The servers 110 may also include one or more instances of computer-readable storage medium or media 116, which couple to the bus systems 114. The bus systems 114 may enable the processors 112 to read code and/or data to/from the computer-readable storage media 116. The media 116 may represent apparatus in the form of storage elements that are implemented using any suitable technology, including but not limited to semiconductors, magnetic materials, optics, or the like. The media 116 may include memory components, whether classified as RAM, ROM, flash, or other types, and may also represent hard disk drives.

The storage media 116 may include one or more modules of instructions that, when loaded into the processor 112 and executed, cause the servers 110 to perform various techniques related to routing users to receive online services based on online behavior. As detailed throughout this description, these modules of instructions may also provide various tools or techniques by which the servers 110 may provide for routing users to receive online services based on online behavior using the components, flows, and data structures discussed in more detail throughout this description. For example, the storage media 116 may include one or more software modules that implement resource throttling tools 118.

For the purposes of this description, but not to limit possible implementations, the terms "service" or "services" may refer to software applications hosted remotely on server systems. The software applications may provide or perform various functions, including but not limited to word processing or document editing; spreadsheet applications; database management systems; presentation applications; communications utilities; e-mail, instant message (IM), online chat, or other similar applications; and the like. Typically, these services are hosted by remote servers for access by users via suitable browser software, with the browsers operating as clients in a client/server scenario.

Turning to the resource throttling tools 118 in more detail, in overview, these tools 118 may include software operative to selectively route or connect the users 102 (acting through the client systems 104) to server systems 120*a* and 120*n* (collectively, server systems 120) to access hosted or online services. FIG. 1 provides two examples at the server systems 120 only for clarity of illustration, but not to limit possible implementations. In some cases, the individual server systems 120*a* and 120*n* may represent a single server system. In other cases, the individual server systems 120*a* and 120*n* may represent a cluster of server systems.

In an example implementation scenario, the throttling server 110 may regulate user access to the different server systems 120, directing users 102 to appropriate server systems 120 depending upon online behavior exhibited previously by these users 102. For example, the throttling server 110 may logically organize or separate any number of individual server systems 120 into two or more groups or partitions, with this separation represented generally at 122. Those users 102 that exhibit certain online behavior (e.g., "good" behavior) may be routed to a first group of server systems (e.g., 120*a*), while those users 102 that exhibit other online behavior (e.g., "bad" behavior) may be routed to a second group of server systems (e.g., 120*n*). Subsequent drawings and description provide additional detail and elaborate further on how the throttling servers 110 provide for routing users to receive online services based on online behavior.

The throttling servers 110 are shown separate from the server systems 120 only for convenience of illustration and description, but not to limit possible implementations of this description. More specifically, these implementations may perform processing allocated to different servers 110 or 120 on the same physical systems, without departing from the scope and spirit of the present description. For example, at least some processing described herein with the throttling servers 110 may be performed on the same physical systems that also perform functions allocated herein to the server systems 120.

The server systems 120*a* and 120*n* may be visualized as "front end" server systems to which the users 102 may be routed, depending on online behavior characteristics associated with the users, as may be indicated by scores calculated for those users 102. In some implementations, the throttling server 110 may operate as a standalone unit on behalf of any number of the server systems 120*a* and 120*n*. In other implementations, the functions of the throttling server 110 may be integrated into the server systems 120. In any scenario, the server systems 120*a* and 120*n* may receive requests from the users 102.

The resource throttling tools 118, whether running on the throttling server 110 or locally on the server systems 120, may provide tools that track the performance of software running on the server systems 120. These tools may be provided by the operating systems (OSs) running on the throttling servers 110 or the server systems 120. In either event, these tools may maintain performance counters, which may be created by the OSs or other software running on the server systems 120. More generally, any software that is running on the server systems 120 may create the performance counters, and write numerical values to those counters. For example, these numbers may represent absolute values (e.g., a number of pending requests in a given queue associated with the software or the server), percentages (e.g., a percentage of CPU resources used or unused at a given time), or the like.

Turning to the performance counters in more detail, the operating system may provide and automatically populate some performance counters. Examples of such performance counters may include, but are not limited to:

CPU usage (e.g., expressed as a percentage of total CPU capacity);

free memory (e.g., expressed as a number available megabytes, percentage of total memory that is unallocated, or the like); and/or physical disk time (e.g., expressed as a percentage of time that the disk spends actively servicing read or write requests).

Other performance counters may be provided and populated automatically by a web runtime environment (e.g., ASP-.NET, or equivalents). Examples of such other performance counters may include, but are not limited to:

how many requests are queued at a given time by the web runtime environment; and/or the time that requests are waiting for service from the web runtime environment.

In some implementations, the resource throttling tools 118 may create additional performance counters, and may write to those counters from on the server systems 120. Examples of these performance counters may include, but are not limited to:

how many requests to access storage/database resources are outstanding at a given time; and/or wait times associated with requests to access storage/database resources.

As noted above, the resource throttling tools 118 may run on the server systems 120 or on the throttling servers 110. The resource throttling tools 118 may route users 102 to particular server systems 102. In turn, those users 102 may direct requests to their assigned server systems 102. The resource throttling tools 118 may receive and process these incoming requests from the users 102. The resource throttling tools 118 may also examine the current values for the above different performance counters described. If the values for any of these performance counters at a given server system 120 exceed a configurable threshold when a given request arrives, the resource throttling tools 118 may reject the request, since the performance counters indicate that the server system 120 is likely already under heavy usage. In addition, the resource throttling tools 118 may route new users away from the given server system 120.

Turning to these thresholds in more detail, the thresholds may be configurable or adjustable "on the fly". Put differently, the resource throttling tools 118 may update the thresholds as appropriate, without doing a full software redeployment to the entire server system. In this manner, the resource throttling tools 118 may better react to traffic spikes and unexpected usage patterns. In addition, different server systems 120 may apply different thresholds. For example, one server system allocated to "good" users may apply one set of thresholds, while another server system allocated to "bad" users may apply a different set of thresholds. These examples may be extended to any number of server systems, and any number of corresponding thresholds applied by those server systems.

Different server systems 120a and 120n (in general, any number of server systems 120) may operate as described herein to isolate different groups of users. However, these server systems 120 may also offer different experiences to those users who are routed to these server systems 120. For example, these different server systems may offer more or fewer features, stronger or more lenient throttling, and the like. Thus, the routing techniques described herein may influence not only the locations where users are processed, but also the functionality offered to those users.

As appreciated from the foregoing description, the ability to reject requests from users as described may provide a multi-level defense against users who, maliciously or not, consume disproportionate resources. Put differently, this ability to analyze and reject user requests may provide a "defense in depth" against such users. In general, implementations of this description may seek to avoid routing "good" users to clusters allocated for "bad" users, and thus may err toward occasionally allowing "bad" users onto the "good" clusters. For example, such implementations may deem it preferable mistakenly to provide "bad" users with good service, rather than providing "good" users with bad service.

In light of the foregoing considerations, applying a system-wide metric indicating user behavior (e.g., "good" user scores versus "bad" user scores) may result in some scenarios in which "bad" users are routed to "good" clusters. To address these possible scenarios, some implementations of this description may apply the above system-wide metric, in combination with the performance counter metric described above as applied on a per-server basis. In such implementations, the combination of routing decisions made on a system-wide basis (i.e., based on "bad" vs. "good" user scores) and request decisions made on a per-server basis (i.e., based on the performance counter metric) may reduce the consequences to the system as a whole, if some "bad" users are routed to "good" clusters. For example, even if a given "bad" user begins consuming disproportionate resources on a "good" cluster, the throttling features described above may confine the number of requests from that "bad" user that the cluster accepts and processes.

Figure 2:
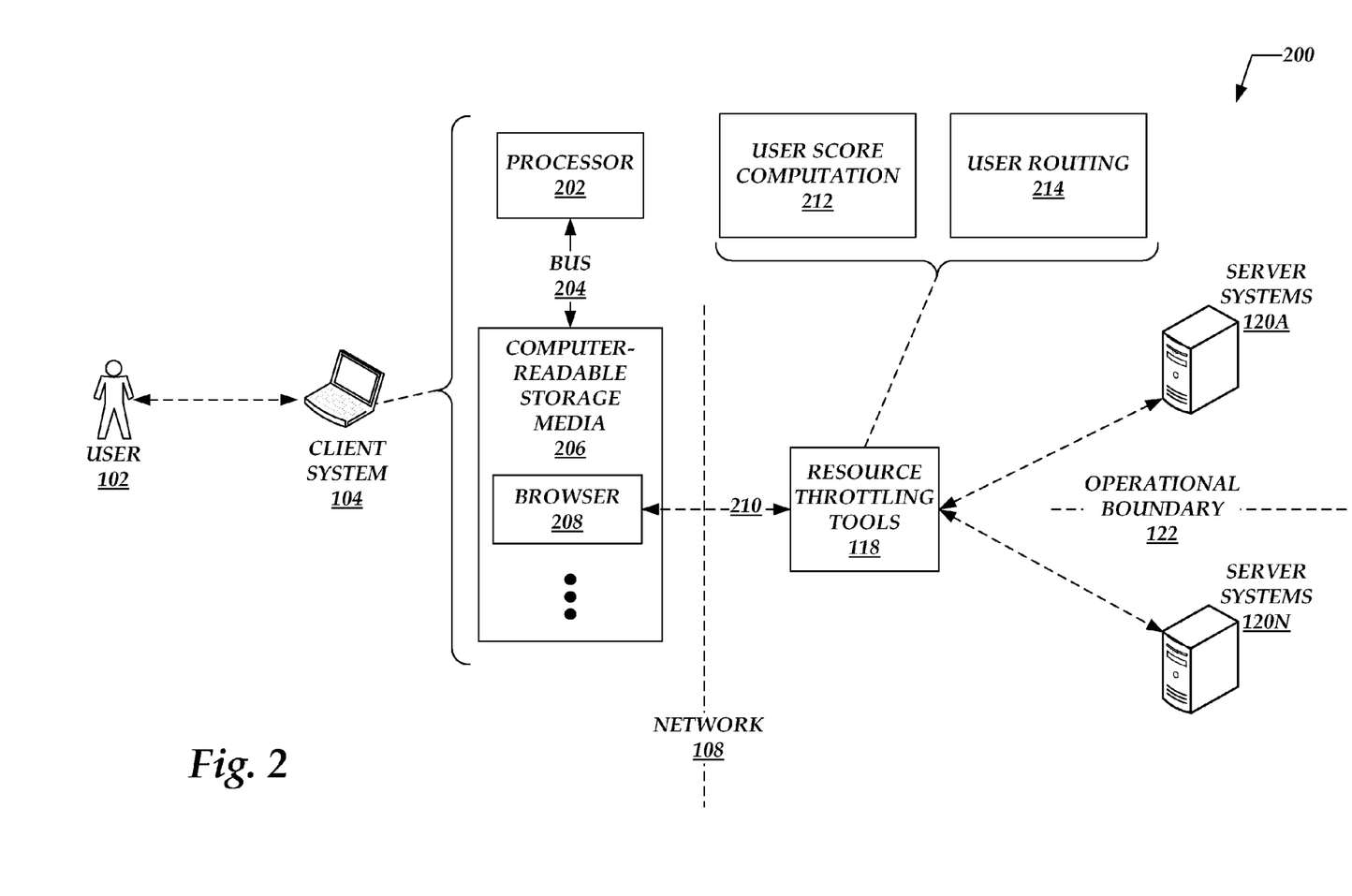
FIG. 2 is a combined block and flow diagram illustrating further details relating to client systems participating in the client/server scenario shown in FIG. 1.

FIG. 2 illustrates further details, denoted generally at 200, relating to client systems participating in the client/server scenario shown in FIG. 1. To facilitate description and reference, but not to limit possible implementations, FIG. 2 carries forward a representative user 102 from FIG. 1, as well as a representative client system 104. In addition, FIG. 2 carries forward representative server systems 120a and 120n, separated by a representative operational boundary 122. FIG. 2 also carries forward the resource throttling tools 118, but omits the throttling server 110 in the interests of clarity.

Turning to the client systems 104 in more detail, these systems may include one or more processors 202, which may have a particular type or architecture, chosen as appropriate for particular implementations. The processors 202 may or may not have the same type or architecture as the processors 112 shown in FIG. 1. The processors 202 may couple to one or more bus systems 204, having type and/or architecture that is chosen for compatibility with the processors 202. The bus systems 204 may or may not have the same type or architecture as the bus systems 114 shown in FIG. 1.

The client systems 104 may also include one or more instances of computer-readable storage medium or media 206, which couple to the bus systems 204. The bus systems 204 may enable the processors 202 to read code and/or data to/from the computer-readable storage media 206. The media 206 may represent apparatus in the form of storage elements that are implemented using any suitable technology, including but not limited to semiconductors, magnetic materials, optics, or the like. The media 206 may include memory components, whether classified as RAM, ROM, flash, or other types, and may also represent hard disk drives.

The storage media 206 may include one or more modules of instructions that, when loaded into the processor 202 and executed, cause the client systems 104 to perform various techniques related to routing users to receive online services based on online behavior. As detailed throughout this description, these modules of instructions may also provide various tools or techniques by which the client systems 104 may provide for routing users to receive online services based on online behavior using the components, flows, and data structures discussed in more detail throughout this description. For example, the storage media 206 may include one or more software modules that implement browser software 208.

Turning to the browser software 208 in more detail, this software may communicate with the resource throttling tools 118 over the representative network 108, as represented generally at 210. For example, the browser software 208 may operate as thin client software that renders content locally on the client system 104 in response to server systems remote from the client system 104 (e.g., the resource throttling tools 118, as well as hosted services described in further detail below).

Turning to the resource throttling tools 118 in more detail, these tools may perform at least two general functions. As represented generally at 212, the resource throttling tools 118 may compute and/or update scores or other indicia that represent online behavior exhibited by particular users 102. As described in further detail below, the score computation 212 or a given user may consider, at least in part, previous behavior or interactions of that given user with an online service. In addition, as represented at 214, the resource throttling tools 118 may route particular users to one of the server systems 120a or 120n, based on the user score computation 212. Having provided this overview of illustrative processing performed by the resource throttling tools 118, a more detailed description of user score computation is now provided with FIG. 3.

Figure 3:
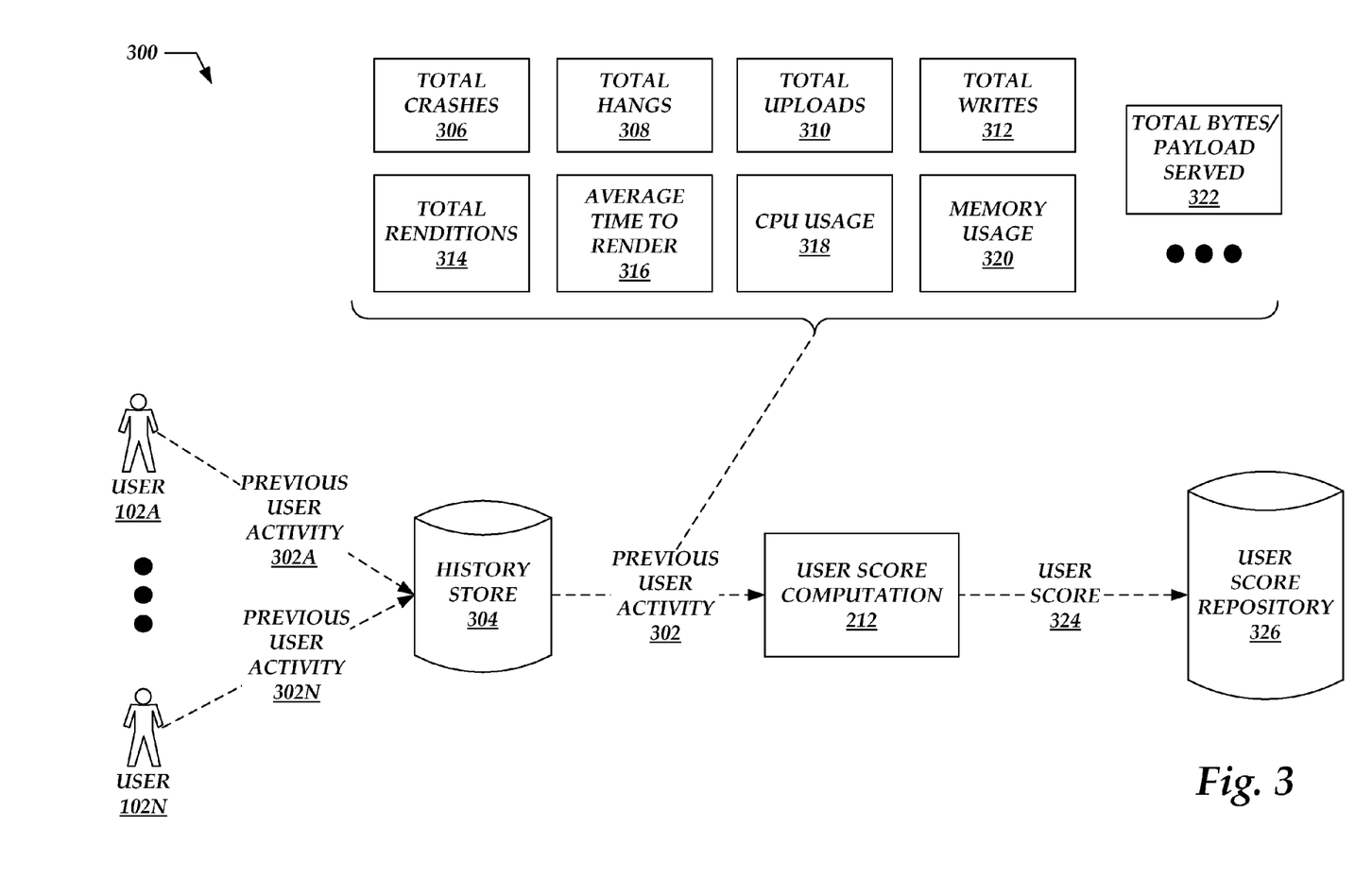
FIG. 3 is a combined block and flow diagram illustrating components and data structures involved with calculating user scores in connection with routing users to receive online services based on online behavior.

FIG. 3 illustrates components and data structures, denoted generally at 300, involved with calculating user scores in connection with routing users to receive online services based on online behavior. For example, without limiting possible implementations, the components and data structures 300 shown in FIG. 3 may be understood to elaborate further on the user score computation 212 shown in FIG. 2.

To facilitate description and reference, but not to limit possible implementations, FIG. 3 carries forward representative users 102a and 102n from FIG. 1. In addition, FIG. 3 carries forward at 212 one or more representative modules for computing scores for these users.

Turning to FIG. 3 in more detail, different users 102a and 102n may be associated with previous user activity, denoted respectively at 302a and 302n (collectively, previous user activity 302). This user activity 302 may represent previous user behavior involving any number of remote or online services. A history store 304 may contain representations of user activity 302a and 302n, as associated with any number of users 102. In turn, a representative user score computation process, carried forward at 212, may process these representations of user activity, denoted collectively at 302.

Turning to the user activity 302 in more detail, the user score computation process 212 may analyze or consider any number of different types of user activity 302. For example, as represented generally at 306, the user score computation 212 may consider a number of times that a given user 102 has been involved with crashing or otherwise rendering a given online service inoperative, for example by uploading one or more particular documents. As represented generally at 308, the user score computation 212 may consider a number of times that the given user 102 has been involved with hanging or otherwise rendering the given online service unresponsive to other users. As represented at 310, the user score computation 212 may consider how many documents the given user has uploaded to the online service.

As represented at 312, the user score computation process 212 may consider a total number of writes associated with the given user. These writes may include a total number of document uploads, and may include any changes to those documents that invalidate cached portions or representations of those documents.

As represented at 314, the user score computation process 212 may consider a number of renditions associated with the given user. These renditions may include a total number of requests to render documents uploaded by the given user. More specifically, these renditions may also include any conversions of the uploaded documents from one file format to another (e.g., converting a relatively proprietary or opaque format into a format that is more widely viewable over the Internet).

As represented at 316, the user score computation process 212 may consider an average time to render documents uploaded by the given user. For example, the results of block 316 may indicate a complexity or size of different documents or files uploaded by the given user. In addition, block 318 represents considering CPU usage associated with processing documents uploaded by the given user, while block 320 represents considering memory usage associated with the given user. Block 322 represents considering a total payload of resources served to the given user, whether measured in terms of bytes transferred, CPU cycles consumed, or any other convenient measure.

In providing the example factors represented by blocks 306-322, it is noted that implementations of this description may consider other factors or quantities in computing scores for users, without departing from the scope and spirit of this description. Different implementations of this description may consider one or more of the factors represented in blocks 306-322, or may consider factors other than those shown in FIG. 3, without departing from the scope and spirit of the present description. In addition, some of the factors shown in blocks 306-322 may be considered alone or in combination, depending on context. For example, if a given user has a "high" value on one of the factors shown in FIG. 3, this value alone may or may not establish that given user as a "good" or "bad" user. However, this value, when considered in context with values for other factors, may contribute to computing the score for that given user.

Generally, the user score computation process 212 may consider one or more factors representing previous user behavior, non-limiting examples of which are shown at block 306-322, in calculating respective user scores 324 for the various users 102a and 102n. In turn, the user score computation process 212 may load respective instances of user scores 324, as associated with particular users 102, into a suitable user score repository 326.

Figure 4:
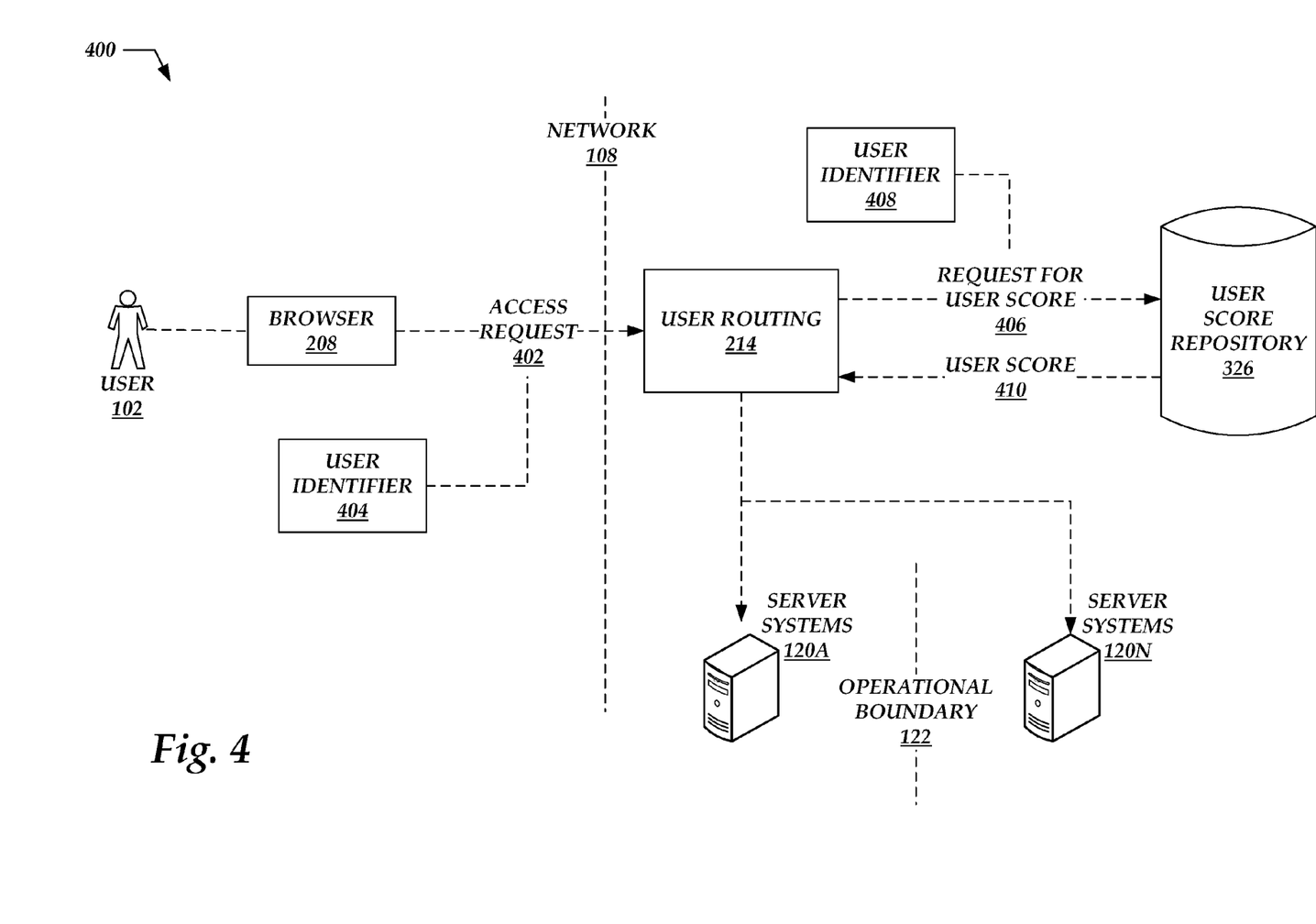
FIG. 4 is a combined block and flow diagram illustrating components and process flows involved with processing access requests from users, and routing users to server systems to access online services.

FIG. 4 illustrates components and process flows, denoted generally at 400, for processing access requests from users, and with routing users to server systems to access online services. For ease of reference, but not to limit possible implementations, FIG. 4 carries forward a representative user 102, who may interact with browser software 208. More specifically, the browser 208 may receive an access request 402 from the user 102. The access request 402 may represent a request by the user 102 to access some type of online service. As shown in FIG. 4, the access request 402 may be associated with a user identifier 404, which serves to distinguish the given user 102 from other users.

The browser 208 may forward the access request 402 over the network 108 to the user routing process 214. Turning to the user routing process 214 in more detail, it may extract the user identifier 404 from the incoming access request 402. In turn, the user routing process 214 may request a score recently calculated for the user that corresponds to the user identifier 404. FIG. 4 denotes at 406 this request for a user score. In addition, this request 406 may be associated with a particular user identifier, represented generally at 408.

The user score repository 326, described above in FIG. 3, may receive the request 406 and related user identifier 408, and search for any user scores corresponding to the input user identifier 408. Assuming that the user score repository 326 contains a score for the input user identifier 408, the repository 326 may return this score, as represented generally at 410.

Returning to the user routing process 214, having received the user score 410, the user routing process 214 may analyze this score 410 to determine the server system 120a or 120n to which the user 102 is to be routed. In example implementation scenarios the server systems 102a may be reserved for users 102 having particular behavior characteristics (e.g., "well-behaved" or "good" users). On the other hand, the server systems 120n may be reserved for users 102 having other particular behavior characteristics (e.g., "poorly-behaved" or "bad" users). In addition, the server systems 120a may be separated from the server systems 120n by the operational boundary 122, such that the consequences of any user misbehavior on the server systems 120*n* are localized to the server systems 120 and do not spread to or affect the server systems 120*a*. In this manner, the operational boundary 122 between the server systems 120*a* and 120*n* may achieve a throttling effect that serves to limit the resources available to misbehaving users 102.

The user routing process 214 may establish thresholds applicable to the user scores 410, to identify which users to route to the server systems 120*a* and which users to route to the server systems 120*n*. For example, assuming that the server systems 120*a* are allocated for "good" users, the user routing process 214 may establish a threshold applicable to the user scores 410, such that any users 102 meeting or exceeding this threshold score are considered "well-behaved" users and are routed to the server systems 120*a*.

As incoming access requests 402 arrive from the users 102, the user routing process 214 may analyze the user scores 410, and decide which of these users 102 to route to the server systems 120*a*. Any users 102 who are not routed to the server systems 120*a* may be routed to any number of other server systems 120*n*. In turn, the users 102 may access the online services through the server systems 120*a* or 120*n* to which they are routed.

It is noted that implementations of this description are not limited to the scenarios provided herein. Such implementations may include any number of server systems 120, as appropriate to provide more or less granularity in different application scenarios. For example, users who score "very bad" may be routed to one system, and users who score "very good" may be routed to another system. However, other users whose scores fall somewhere between these two extremes may be routed to one or more other systems allocated for such users. In general, implementations of this description may group users into any number of classes or categories, and route them to any number of server systems or clusters that correspond to these classes or categories.

Figure 5:
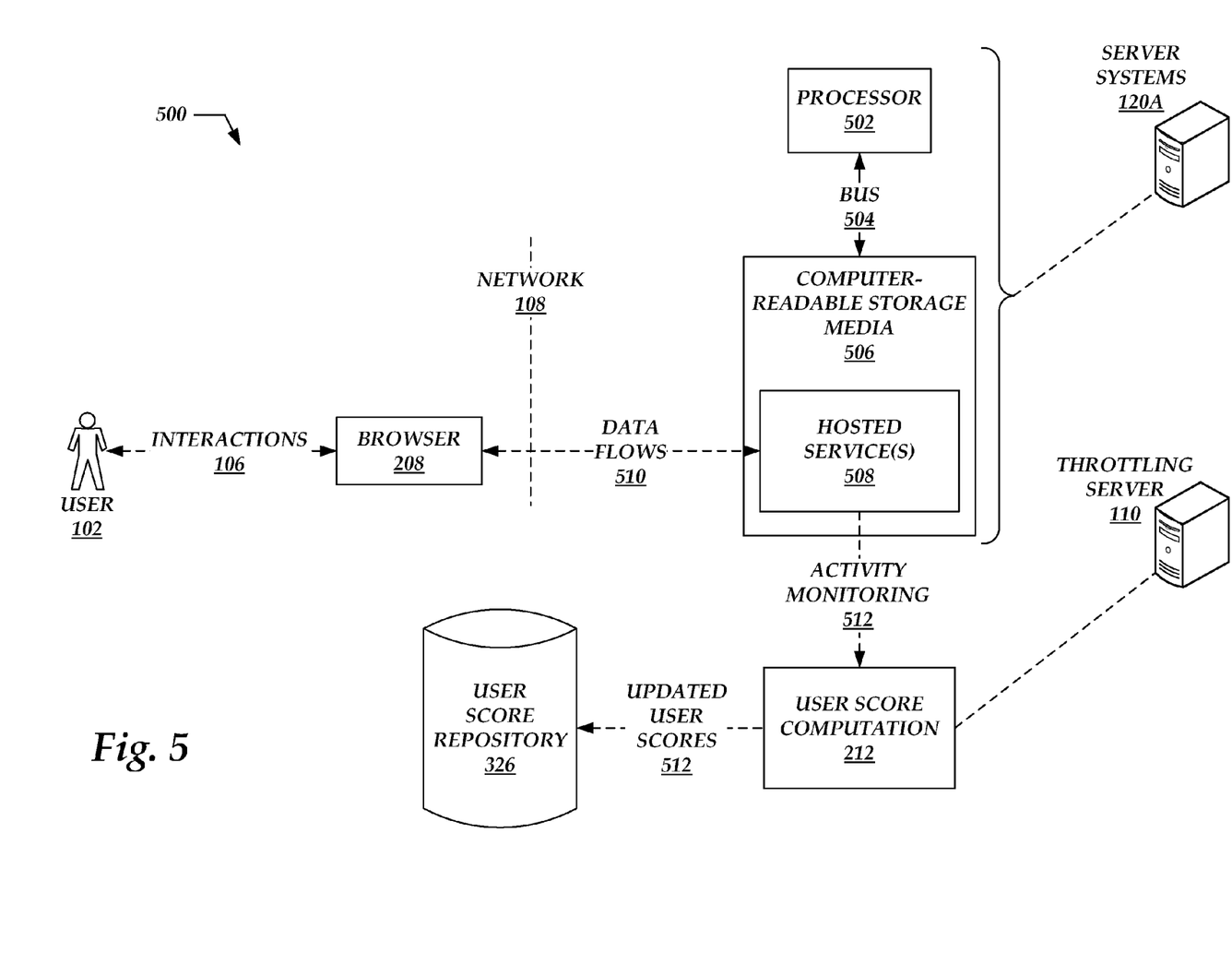
FIG. 5 is a combined block and flow diagram illustrating components and data flows that enable users to access hosted applications in connection with routing users to receive online services based on online behavior.

FIG. 5 illustrates components and data flows, denoted generally at 500, that enable users to access hosted or online applications in connection with routing users to receive online services based on online behavior. For ease of reference and description, but not to limit possible implementations, FIG. 5 carries forward a representative user 102 may conduct any number of interactions 106 through browser software 208. More specifically, the user 102 may be routed to a server system (e.g., 120*a* or 120*n*), for example, as described above with FIG. 4. Once the user 102 is routed to a destination server system 120, the user 102 may access any number of online applications posted through that destination server system 120.

Turning to a representative server system (e.g., 120*a*) in more detail, these server systems may include one or more processors 502, which may have a particular type or architecture, chosen as appropriate for particular implementations. The processors 502 may or may not have the same type and architecture as the processors 112 and 202. The processors 502 may couple to one or more bus systems 504, which may have a type and/or architecture that is chosen for compatibility with the processors 502. The type and architecture of the bus systems 504 may or may not be the same as the bus systems 114 and 204.

The server systems 120*a* may also include one or more instances of computer-readable storage medium or media 506, which couple to the bus systems 504. The bus systems 504 may enable the processors 502 to read code and/or data to/from the computer-readable storage media 506. The media 506 may represent apparatus in the form of storage elements that are implemented using any suitable technology, including but not limited to semiconductors, magnetic materials, optics, or the like. The media 506 may include memory components, whether classified as RAM, ROM, flash, or other types, and may also represent hard disk drives.

The storage media 506 may include one or more modules of instructions that, when loaded into the processor 502 and executed, cause the server systems 120*a* to provide hosted services to the users 102. For example, FIG. 5 provides representative examples of the hosted services at 508. The hosted services 508 may exchange data flows 510 with the browser software 208, thereby enabling the user 102 to interact remotely with the hosted services 508.

As these data flows 510 between the browser software 208 and the hosted services 508 occur over time, the throttling server 110 may monitor these activities, as represented generally at 512. More specifically, the user score computation process 212 may perform the activity monitoring 512, and may update scores associated with the users 102 based on the monitored activities. FIG. 5 denotes these updated user scores at 514, and these scores may be stored in the user score repository 326. The updated user scores 514 may be calculated in light of any of the considerations shown at blocks 306-322 in FIG. 3, as well as other considerations.

Considering an implementation example, assume that a given user 102 is initially scored as a "good" user, and is routed to the server system 102*a* to access the hosted services 508. However, assume further that this given user uploads an extremely large document to the hosted services 508, and that the hosted services 508 crashes the server system 120*a* when attempting to process this large uploaded document. In this scenario, the user score computation process 212 may monitor the activities of this user, as represented generally at 512. In turn, the user score computation process 212 may recompute a score for this given user 102, to indicate that this user 102 is no longer a "good" or "well-behaved" user. Accordingly, the next time that the user 102 requests to access the hosted services 508, the throttling server 110 may direct or route this user 102 to a different server system (e.g., 120*n*). In some cases, if a given "good" user 102 is initially routed to a first server system 120*a*, and thereafter misbehaves in some manner, the throttling server 110 may remove the user 102 from the first server system 120*a*, and re-route the user 102 to another server system 120*n*.

Figure 6:
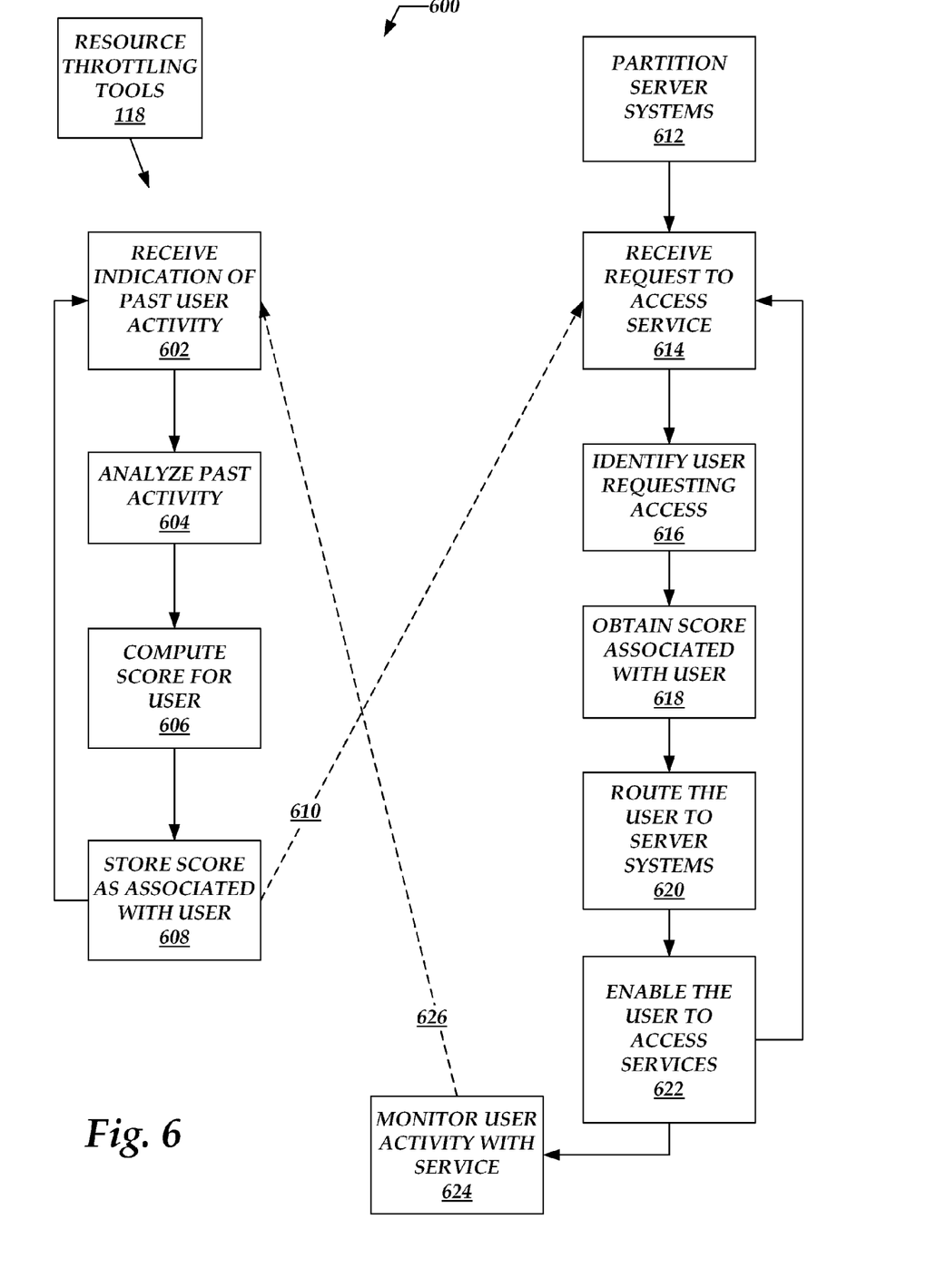
FIG. 6 is a flow diagram illustrating process flows related to routing users to receive online services based on online behavior.

FIG. 6 illustrates process flows, denoted generally at 600, related to routing users to receive online services based on online behavior. To facilitate the present description, but not to limit possible implementations, the process flows 600 may be understood as elaborating on processing performed by the resource throttling tools 118. However, implementations of this description may perform at least portions of the process flows 600 using other components, without departing from the scope and spirit of the present description.

Turning to the process flows 600 and more detail, block 602 represents receiving an indication of past user activity involving at least one online or hosted service. FIG. 3 provides examples of such user activity at 302*a* and 302*n*.

Block 604 represents analyzing indications or representations of this past user activity. FIG. 3 provides examples of such user activity at blocks 306-322.

Block 606 represents computing a score for a given user, based on previous activity associated with that given user. FIG. 3 generally represents such user scores at 324. Implementations of this description may define user scores 324 in a variety of ways (e.g., on a scale from 0 to 1, with scores closer to 1 indicating a "better" or "well behaved" user, or other scoring schemes suitable in different environments). In some cases, a given user may not be associated with any previous activity. In such cases, block 606 may include assigning some default score to such users.

Block 608 represents storing the user score computed in block 606, as associated with the given user. For example, block 608 may include storing the user score in a suitable user score repository (e.g., 326 in FIG. 3). In this manner, block 608 may facilitate subsequent searches for user scores, given an input identifier designating a particular user. FIG. 4 provides examples of a user identifier 408 submitted as part of a query or request 406 that is run against the user score repository 326.

Having computed and stored a score for a number of different users, the process flows 600 may process access requests submitted by these different users. To facilitate this processing, the process flows 600 may transition from block 608 as represented generally by the arrow 610.

Block 612 represents partitioning a plurality of different server systems into at least two different groups or clusters of such server systems. FIG. 1 illustrates a scenario in which a first group of server systems 120a is separated from another group of server systems 120n by an operational boundary 122. As described in previous examples, one group of server systems (e.g., 120a) may be dedicated to a group of users exhibiting certain behavioral characteristics (e.g., "good" users), while another group of server systems (e.g., 120n) may be dedicated to another group of users exhibiting other behavioral characteristics (e.g., "bad" users). In addition, operational boundary 122 may serve to throttle server resources allocated to the latter group of users.

Block 614 represents receiving a request to access an online service. FIG. 4 provides an example of such an access request at 402.

Block 616 represents identifying the user requesting access to the online service. As shown in FIG. 4, the access request 402 may be associated with a corresponding user identifier 404, which serves to distinguish the user 102 from other similar users.

Block 618 represents obtaining a score associated with the user who is submitting the request to access the online service. For example, block 618 may include querying a user score repository (e.g., 326 in FIG. 3) for a score associated with one or more given users, and receiving a user score (e.g., 410 in FIG. 4) in response to this query.

Block 620 represents routing the user to one of the server systems partitioned above in block 612. More specifically, block 620 may include routing the user based upon the score obtained for the user in block 618. For example, block 620 may include making a binary decision on whether to route a given user to a first partition or group of server systems, based on the behavior score computed for that given user. If the score computed for that given user does not qualify that user for access to the first partition or group of server systems, then block 620 may include routing that user to another partition or group of server systems.

Block 622 represents and enabling the user to access hosted or online services via the server systems to which block 620 routed that user. FIG. 5 provides examples of these hosted services at 508.

Block 624 represents monitoring activity associated with the user while interacting with the hosted or online services. In some cases, the process flows 600 may return from block 624 to block 602, as indicated by the arrow 626. In these scenarios, the process flows 600 may recompute a score associated with the user, based on his or her interaction with the hosted or online services. This recomputed score may be used to route or reroute the user to appropriate server systems.

The foregoing description provides technologies for routing users to receive online services based on online behavior. Although this description incorporates language specific to computer structural features, methodological acts, and computer readable media, the scope of the appended claims is not necessarily limited to the specific features, acts, or media described herein. Rather, this description provides illustrative, rather than limiting, implementations. Moreover, these implementations may modify and change various aspects of this description without departing from the true spirit and scope of this description, which is set forth in the following claims.

We claim:

1. A computer-implemented method comprising computer-implemented operations for:
   receiving a representation of an interaction between a user and a remotely hosted online service accessible via a plurality of server systems;
   analyzing the representation by analyzing a number of crashes or hangs of the online service that are associated with activity of the user and analyzing processor usage or memory usage associated with the online service that is associated with the user;
   computing a score associated with the user based on the representation, the score indicating whether user activity associated with the interaction corresponds to a first type of behavior or a second type of behavior;
   identifying, based upon the score, one of the plurality of server systems to which the user is to be routed to obtain the remotely hosted online service;
   associating the score with the user;
   storing the score;
   receiving an indication that the user is requesting access to the remotely hosted online service;
   obtaining the score associated with the user;
   routing the user to the one of the plurality of server systems based upon the score;
   monitoring behavior of the user during a further interaction between the user and the remotely hosted online service; and
   in response to determining that the behavior of the user during the further interaction corresponds to the first type of behavior,
      redirecting the user to another server of the plurality of servers, and
      updating the score to reflect the behavior.

2. The method of claim 1, wherein updating the score to reflect the behavior comprises recomputing the score based, at least partially, upon the behavior.

3. The method of claim 1, further comprising computing and storing a further score for a further user, wherein the further score is used to determine a server system to which the further user is to be routed to obtain online services.

4. The method of claim 1, wherein the first type of behavior comprises good behavior, and the second type of behavior comprises bad behavior.

5. The method of claim 1, further comprising:
   partitioning the server system into at least two partitions;
   associating a first partition with a first category of users who are associated with a first score; and
   associating a second partition with a second category of users who are associated with a second score.

6. A computer-readable storage medium that is not a signal, the computer-readable storage medium comprising computer-executable instructions that, when executed by a computer, cause the computer to:

receive a representation of an interaction between a user and a remotely hosted online service accessible via a plurality of server systems;

analyze the representation by analyzing a number of crashes or hangs of the online service that are associated with activity of the user and analyzing processor usage or memory usage associated with the online service that is associated with the user;

compute a score associated with the user based on the representation, the score corresponding to a type of behavior during user activity associated with the interaction;

identify, based upon the score, one of the plurality of server systems to which the user is to be routed to obtain the remotely hosted online service;

associate the score with the user;

store the score;

receive an indication that the user is requesting access to the remotely hosted online service;

obtain the score associated with the user;

route the user to the one of the plurality of server systems, based upon the score;

allow the user to access the remotely hosted online service via the server system;

monitor behavior of the user during a further interaction between the user and the remotely hosted online service; and in response to determining that the behavior of the user during the further interaction corresponds to the type of behavior,
- redirect the user to another server of the plurality of servers, and
- update the score to reflect the behavior.

7. The computer-readable storage medium of claim 6, further comprising computer-executable instructions that, when executed by the computer, cause the computer to recompute the score for the user based upon interactions between the user and the online service.

8. The computer-readable storage medium of claim 7, further comprising computer-executable instructions that, when executed by the computer, cause the computer to reroute the user from the server system to a further server system based on the recomputed score.

9. The computer-readable storage medium of claim 6, further comprising computer-executable instructions that, when executed by the computer, cause the computer to compute a score for a further user, based on interactions between the further user and the online service.

10. The computer-readable storage medium of claim 6, further comprising computer-executable instructions that, when executed by the computer, cause the computer to:
- partition the server system into at least two partitions;
- associate a first partition with a first category of users who are associated with a first score; and
- associate a second partition with a second category of users who are associated with a second score.

11. The computer-readable storage medium of claim 6, wherein updating the score to reflect the behavior comprises recomputing the score based, at least partially, upon the behavior.

12. A computer-readable storage medium that is not a signal, the computer-readable storage medium comprising computer-executable instructions that, when executed by a computer, cause the computer to:

receive a representation of an interaction between a user and a remotely hosted online service accessible via a plurality of server systems;

analyze the representation by analyzing a number of crashes or hangs of the online service that are associated with activity of the user and analyzing processor usage or memory usage associated with the online service that is associated with the user;

compute a score associated with the user based on the representation, the score indicating whether user activity associated with the interaction corresponds to a first type of behavior or a second type of behavior;

identify, based upon the score, one of the plurality of server systems via which the user is to be routed to obtain the remotely hosted online service;

associate the score with the user;

store the score;

receive an indication that the user is requesting access to the remotely hosted online service;

obtain the score associated with the user;

route the user to the one of the plurality of server systems based upon the score;

monitor behavior of the user during a further interaction between the user and the remotely hosted online service; and in response to determining that the behavior of the user during the further interaction corresponds to the first type of behavior,
- redirect the user to another server of the plurality of servers, and
- update the score to reflect the behavior.

13. The computer-readable storage medium of claim 12, further comprising computer-executable instructions that, when executed by the computer, cause the computer to compute and store a further score for a further user, wherein the further score is used to determine a server system to which the further user is to be routed to obtain online services.

14. The computer-readable storage medium of claim 12, wherein the first type of behavior comprises good behavior, and the second type of behavior comprises bad behavior.

15. The computer-readable storage medium of claim 12, further comprising computer-executable instructions that, when executed by the computer, cause the computer to:
- partition the server system into at least two partitions;
- associate a first partition with a first category of users who are associated with a first score; and
- associate a second partition with a second category of users who are associated with a second score.

16. The computer-readable storage medium of claim 12, wherein updating the score to reflect the behavior comprises recomputing the score based, at least partially, upon the behavior.

\* \* \* \* \*